May 11, 1965     T. H. GRETHER ETAL     3,182,459
APPARATUS FOR POSITIONING FLUID BARRIERS
Filed Dec. 5, 1962     9 Sheets-Sheet 1

INVENTORS
TOBIAS H. GRETHER
JAMES BERMANN
BY Harold R. Beck
ATTORNEY

INVENTORS
TOBIAS H. GRETHER
JAMES BERMANN
BY *Harold P. Beck*
ATTORNEY

May 11, 1965  T. H. GRETHER ETAL  3,182,459
APPARATUS FOR POSITIONING FLUID BARRIERS
Filed Dec. 5, 1962  9 Sheets-Sheet 5

INVENTORS
TOBIAS H. GRETHER
JAMES BERMANN
BY *Harold R. Beck*
ATTORNEY

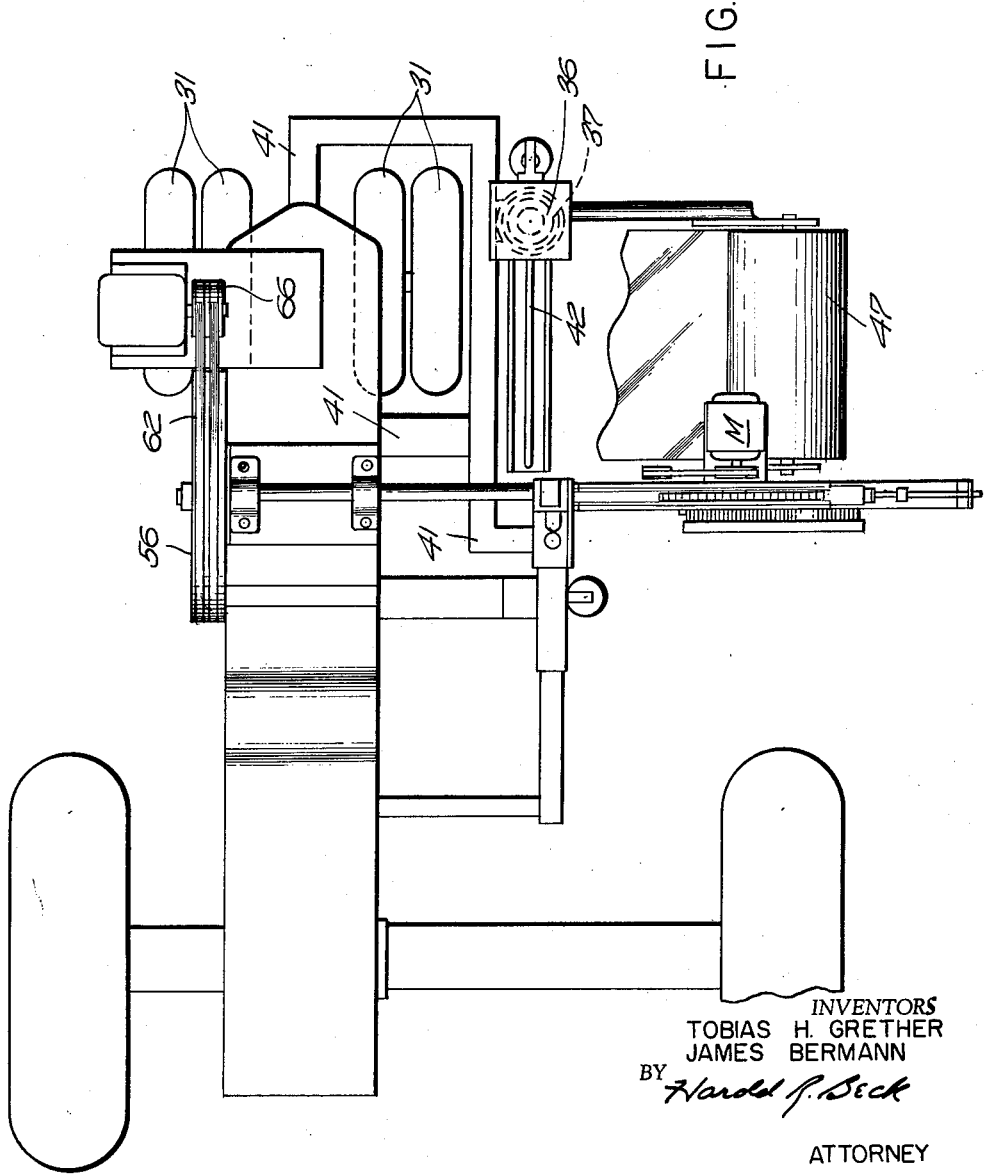

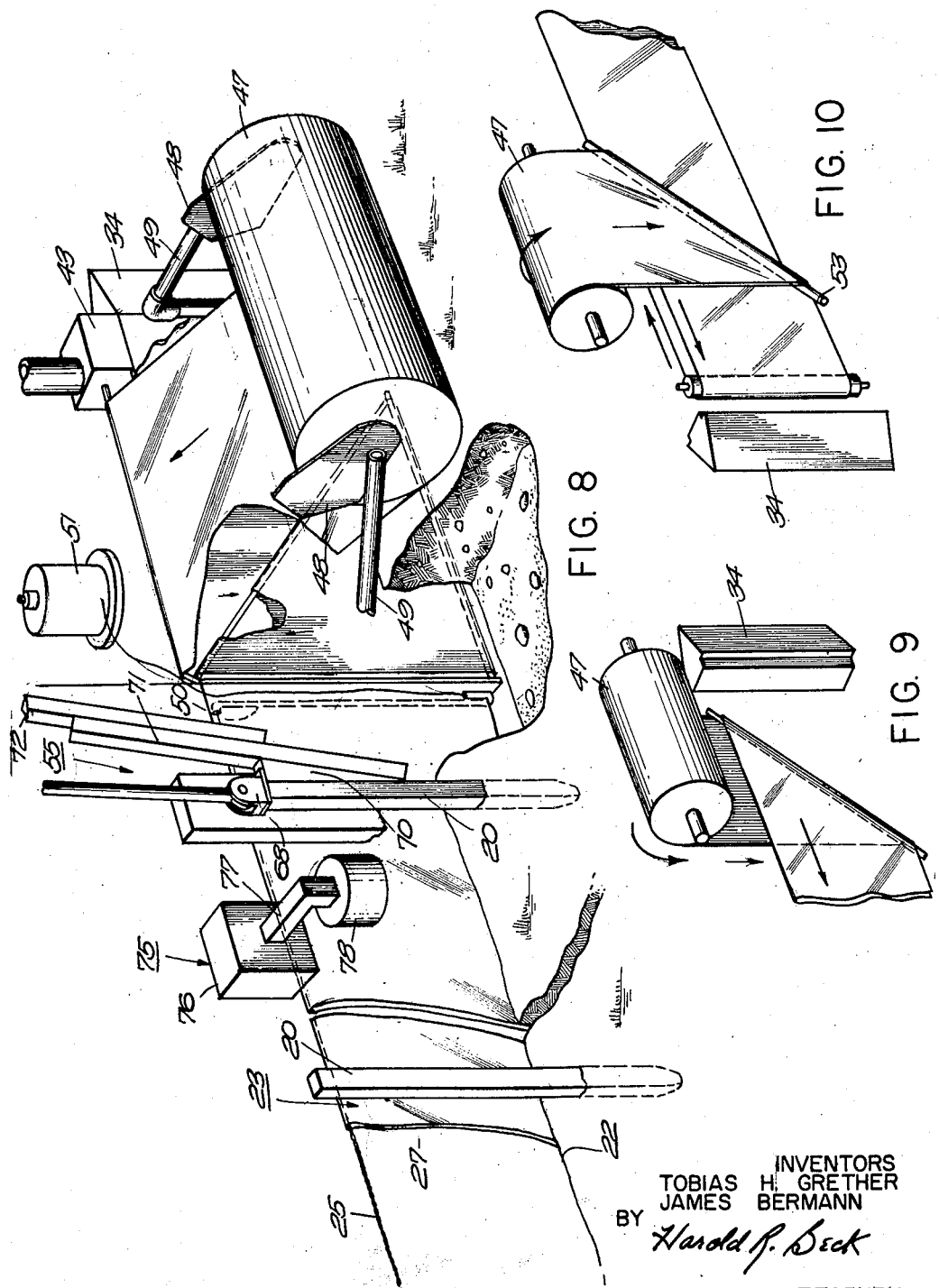

INVENTORS
TOBIAS H. GRETHER
JAMES BERMANN
BY Harold F. Beck
ATTORNEY

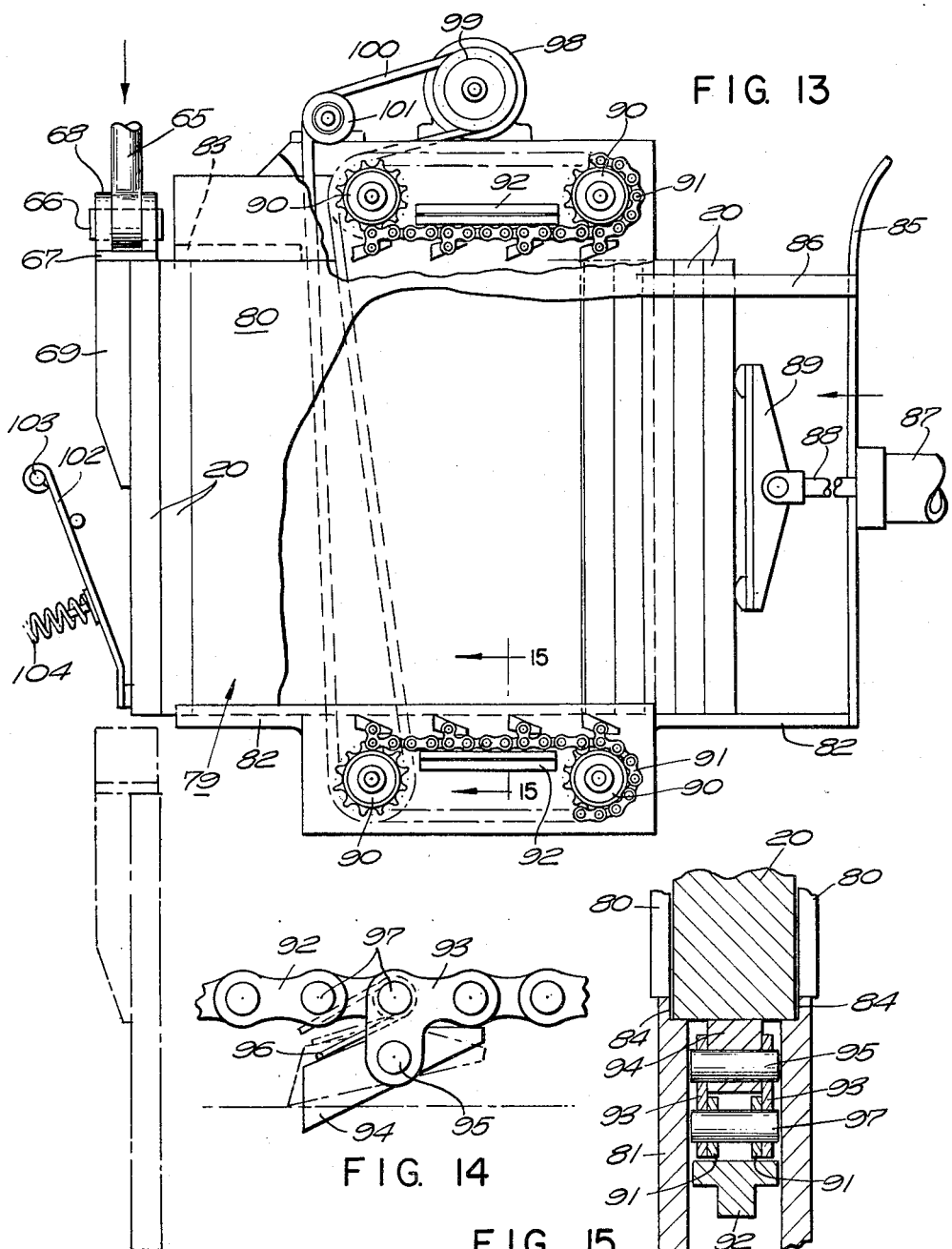

3,182,459
APPARATUS FOR POSITIONING FLUID BARRIERS
Tobias H. Grether, Camarillo, and James Bermann, Oxnard, Calif., assignors to Consolidated Thermoplastics Company, Stamford, Conn., a corporation of Delaware
Filed Dec. 5, 1962, Ser. No. 242,548
8 Claims. (Cl. 61—63)

This is a continuation-in-part of application Serial No. 135,951, filed September 5, 1961.

Earthen mounds are frequently used to impound or channelize water. Such earthen mounds are used along the edge of rivers, lakes, and in agricultural uses for directing irrigation water and forming levees in rice fields and the like. Typically, a rice field is surveyed to establish various terraces and earthen levees are constructed along the periphery of the terrace to impound water within the terrace area at a higher level than the water impounded at a lower terrace area. It has been found that these earthen levees have many disadvantages, including: (1) reduction of rice yield within the area extending up to ten feet from the earthen levee due to soil removal and the propensity of weeds and water grass to grow in this area; (2) frequent washouts of the levees during periods of high winds; and, (3) the earthen levees provide a time consuming obstacle in the preparation of the rice field prior to planting, since the plowing and fertilizing apparatus must maneuver within the periphery of the earthen levees; and a similar obstacle to a simple and economical harvesting of the rice crop since the harvesting equipment must operate within the periphery of the earthen levee and paths must be broken through the levees to pass from one terrace to the next.

Thus, many advantages would accrue to a rice grower if the earthen levees could be eliminated. The present invention is particularly directed to a method and apparatus for quickly and easily erecting a synthetic peripheral levee for a rice field, which levee replaces the conventional earthen levee. This synthetic levee is described in U.S. patent application Serial Number 135,951.

To be economically sound, it is essential that the erection of the levee described in the aforementioned patent application be a method which minimizes hand labor and maximizes the use of powered equipment. Our invention accomplishes this end by providing a method and apparatus which can function at high capacity while utilizing only one or two operators.

Our method according to the present invention includes the basic steps of (1) forming a continuous opening in the soil along a path where one desires to erect a water barrier; (2) positioning a continuous sheet of plastic film vertically above the soil opening with the lower edge of the film extending into said opening (the film is disposed entirely vertically, or in an S or Z shape, or an L shape with the lower leg of the L disposed entirely within the soil opening); (3) partly or completely filling said soil opening to form a substantially fluid tight seal between the plastic film and the soil; and (4) positioning rigid uprights adjacent the soil opening and fastening the vertically disposed film to the uprights.

Our method is accomplished by a unique apparatus which includes the following basic elements: (1) a cutting and/or digging mechanism engageable with the soil to provide a continuous opening in the soil along a desired path; (2) a feeding and positioning mechanism to establish the plastic film vertically in and above the soil opening; (3) a driving mechanism to position the uprights in the soil adjacent the continuous opening; and, (4) a positioning mechanism to fasten the plastic film to the upright.

In the drawings, we have described a present preferred embodiment of our invention in which:

FIGURE 7 is a plan view of the apparatus according to the present invention;

FIGURE 8 is a perspective of a portion of the machine according to the present invention with parts removed for clarity;

FIGURE 9 is a perspective of an alternative arrangement for feeding plastic film according to the present invention;

FIGURE 10 is a perspective of a second alternative arrangement for feeding plastic film according to the present invention;

FIGURE 13 is a side elevation view of a stake-feeder according to the present invention;

FIGURE 14 is an enlarged side elevation view of a portion of a stake-feeder dog for moving the stake in the feeder shown in FIGURE 12; and, FIGURE 15 is a cross-section taken on line 15—15 of FIGURE 12.

Figure 1:
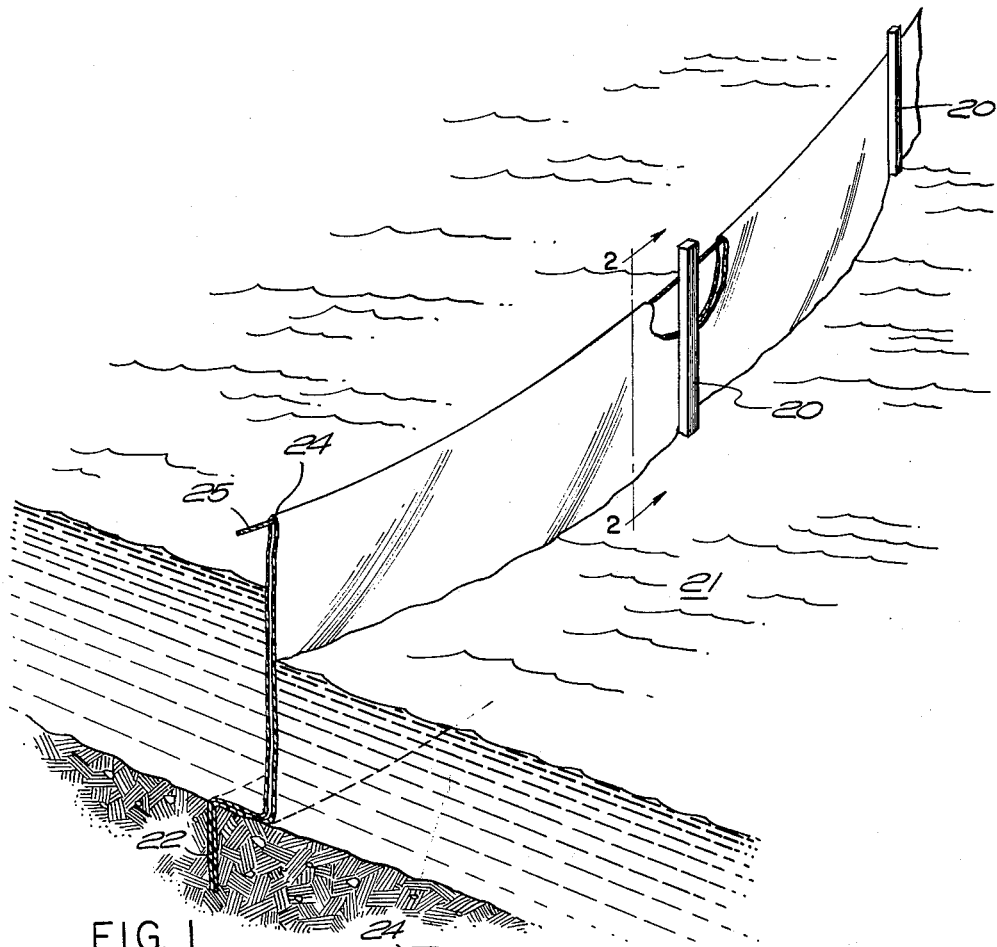
FIGURE 1 is a perspective of a water barrier, specifically a rice field levee, erected by use of the method and apparatus of the present invention.

Briefly the present invention is directed to a method and apparatus for erecting a synthetic water barrier, specifically a synthetic levee for a rice field. This synthetic levee comprises, in combination, a plurality of uprights with a portion of each upright disposed within and supported by the soil; a substantially fluid impervious, flexible member, such as plastic sheet or film, folded longitudinally into two side portions with a crease along the upper edge; a longitudinal support member (i.e., a string or cord) disposed along and affixed to the upper edge of the sheet, and preferably disposed within the crease, and attached to each upright at a spaced point above the soil; and the lower edge (or edges) of the side portions of the fluid impervious member being positioned in fluid sealing relationship with the soil whereby a fluid barrier is established. The barrier can be endless with a regular or irregular linear pattern or can be disposed between two other fluid barriers with its ends in fluid sealing relationship with such barriers.

Our method according to the present invention includes inserting a plurality of uprights partially into the soil in a predetermined linear path, positioning a fluid impervious, planar, flexible member, such as plastic sheet or film, vertically along the linear path and in engagement with the uprights, positioning an elongated support member longitudinally along and affixed to the upper edge of the flexible member; attaching the support member to each upright at a point spaced above the soil; and sealing the lower edge of the side portions of the fluid impervious member in a fluid sealing relationship with the soil whereby a fluid barrier is established. Preferably a slit is cut in the soil into which the lower edges of the fluid impervious member are inserted to form the fluid sealing relationship with the soil. The fluid impervious, flexible member preferably is a continuous plastic sheet folded longitudinally to provide parallel side portions and a crease in the upper folded edge which receives the elongated support member.

Our apparatus according to the present invention includes a powered vehicle, either wheel or track mounted, movable along a path over the soil, the vehicle being adapted to carry and supply operating power to various elements including: a subsoiler or plow mounted on the front of the vehicle and engageable with the soil to penetrate and cut a vertical slit, trench or channel (hereinafter called "trench") in the soil; a film feeding mechanism to supply the fluid impervious barrier immediately behind the plow or subsoiler and deposit the lower edge (or edges) of the barrier into the trench; with the barrier disposed normal to the soil surface means to supply the elongated support member longitudinally disposed along and affixed to the upper edge of the barrier or within a crease in the upper edge of the barrier; means to embed the lower end of the uprights in the soil at a desired point relative to the soil trench; and preferably means to attach the elongated support member to the uprights.

Figure 2:
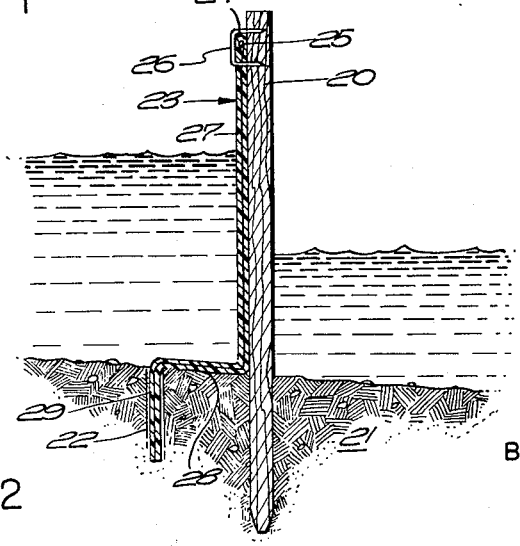
FIGURE 2 is a vertical cross-section through the barrier taken on line 2—2 of FIGURE 1.

Referring specifically to FIGURES 1 and 2 of the drawings, a plurality of rigid uprights 20 are partially disposed within the soil 21. The upright is preferably a wooden stake having a lower portion extending into the soil and an upper portion extending above the soil, and are spaced apart at substantially uniform intervals. The uprights are aligned in a predetermined linear path or pattern which defines a regular or irregular endless configuration or can extend from one fluid barrier to a second fluid barrier. Although wooden stakes are preferred as the uprights, other rigid materials such as metal or plastic supports can also be utilized successfully.

Preferably the stakes are thirty inches long and are driven into the soil about fourteen inches. The stakes are inserted into the soil on the downhill side of the field with respect to the location of the trench 22 and are spaced about four feet apart with each stake being about four inches from the near edge of the trench 22 as shown in the preferred embodiment of FIGURE 2.

A substantially fluid impervious, flexible member 23, folded longitudinally into two side portions to form a crease 24 along the upper edge of the member 23 and having an elongated support 25 longitudinally disposed within the crease, is attached by a staple 26 about the crease to each upright 20 at a spaced point above the soil 21.

Although we prefer to utilize a staple in attaching the support member to the upright support, other modes of attachment can be used either through use of manual means or automatic machine means as described in the present application.

The fluid impervious member is preferably rectangularly shaped and folded longitudinally into two uniform side portions. A roll of lay-flat polyethylene tubing having a thirty inch width and slit along one edge is advantageously employed as the fluid impervious flexible member. We have found that various film thicknesses can be used but prefer a film having a thickness of about 3.5 mils and folded into two side portions to provide a total thickness of about 7 mils is very effective as a fluid barrier in a synthetic levee for use in rice growing. Other materials which can be used in fabricating the fluid impervious member include for example, polypropylene, water-proof paper, fiber glass and rubber.

The elongated support member 25 can be twine, wire or synthetic woven material and we have found a three-hundred pound test baler twine is particularly effective as a support member.

The folded plastic film has an upper section 27, an intermediate section 28 and a lower section 29. The upper section 27 of the folded film extends from the point of attachment to the upright to the soil adjacent to the upright and continuous as the intermediate section 28 which overlies a portion of the soil adjacent to the stake. The intermediate section terminates in a lower section 29 which is disposed in fluid sealing relationship with the soil 21. In our preferred embodiment, the lower section 29 is disposed within a trench 22 cut in the soil in the manner to be described hereinafter and the trench is in substantially uniform spaced relationship to the stakes. Soil is compacted around the lower section disposed in the trench to form a fluid seal at the junction of the film and the soil. Preferably the trench 22 is about one and one-half inches wide and about nine inches deep.

The power plant for our invention is a conventional tractor 30 having a pair of spaced front wheels 31 and driven spaced rear wheels 32. For purposes of the present illustration, we have shown this conventional tractor 30 with the rear axle extended on the right side of the tractor to provide operational stability for the tractor in use. This conventional tractor has been further modified to provide power sources for the various power actuated devices to be described hereinafter. Preferably, the internal combustion engine, for driving the rear wheels of the tractor, also drives a pump to supply pressurized fluid for use in hydraulic cylinders and motors, to be described hereinafter. As is well-known in the art, conventional switches and valves are mounted on the tractor, within easy reach of the tractor operator, for controlling the flow of pressurized fluid to and from the hydraulic cylinders and motors.

Figure 3A:
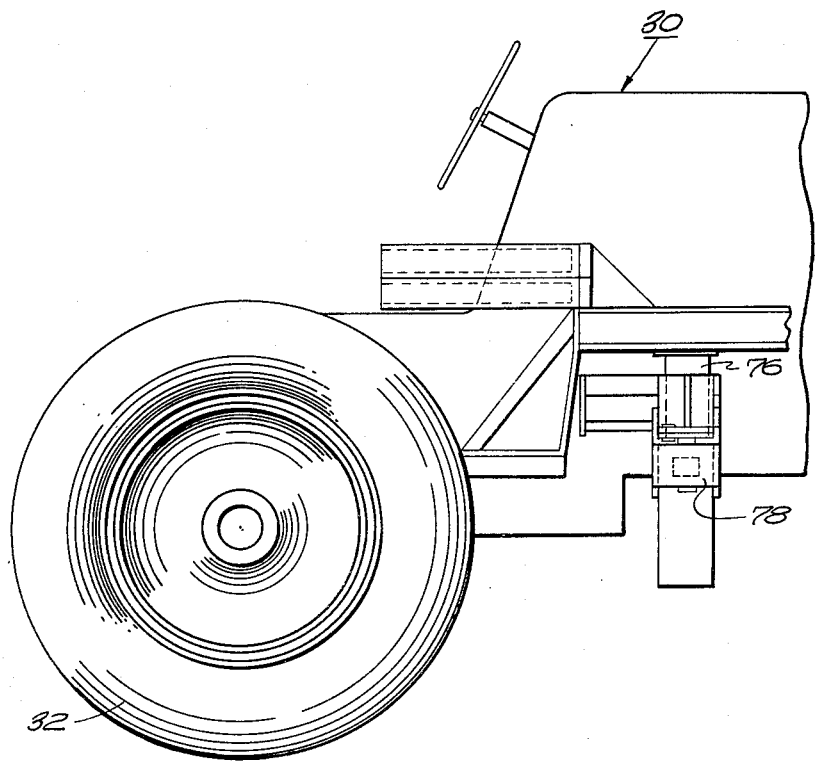
FIGURE 3A is a side elevation view of a rear portion of the apparatus according to the present invention.
Figure 3B:
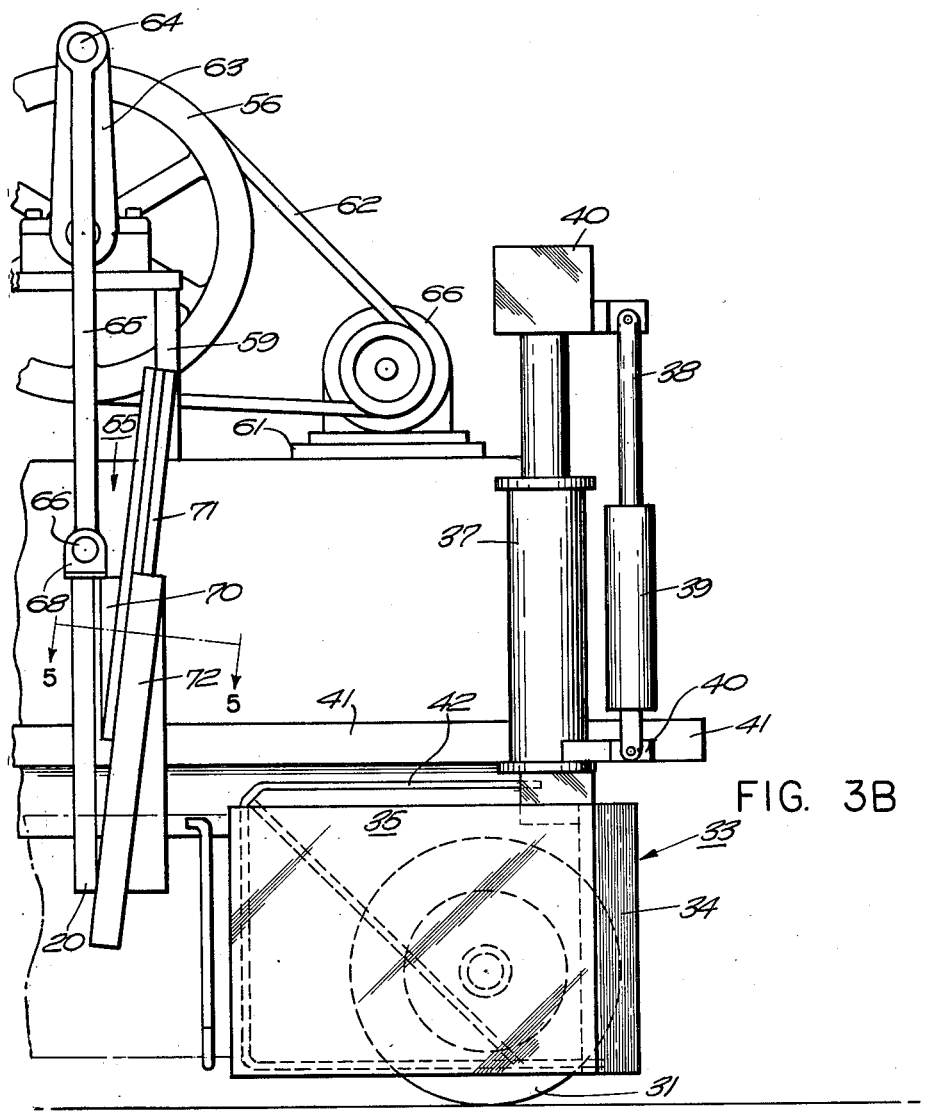
FIGURE 3B is a side elevation view of a front portion of the apparatus according to the present invention with parts removed for clarity, a subsoiler and stake driver in raised position, and constitutes a continuation of FIGURE 3A.
Figures 4, 5:
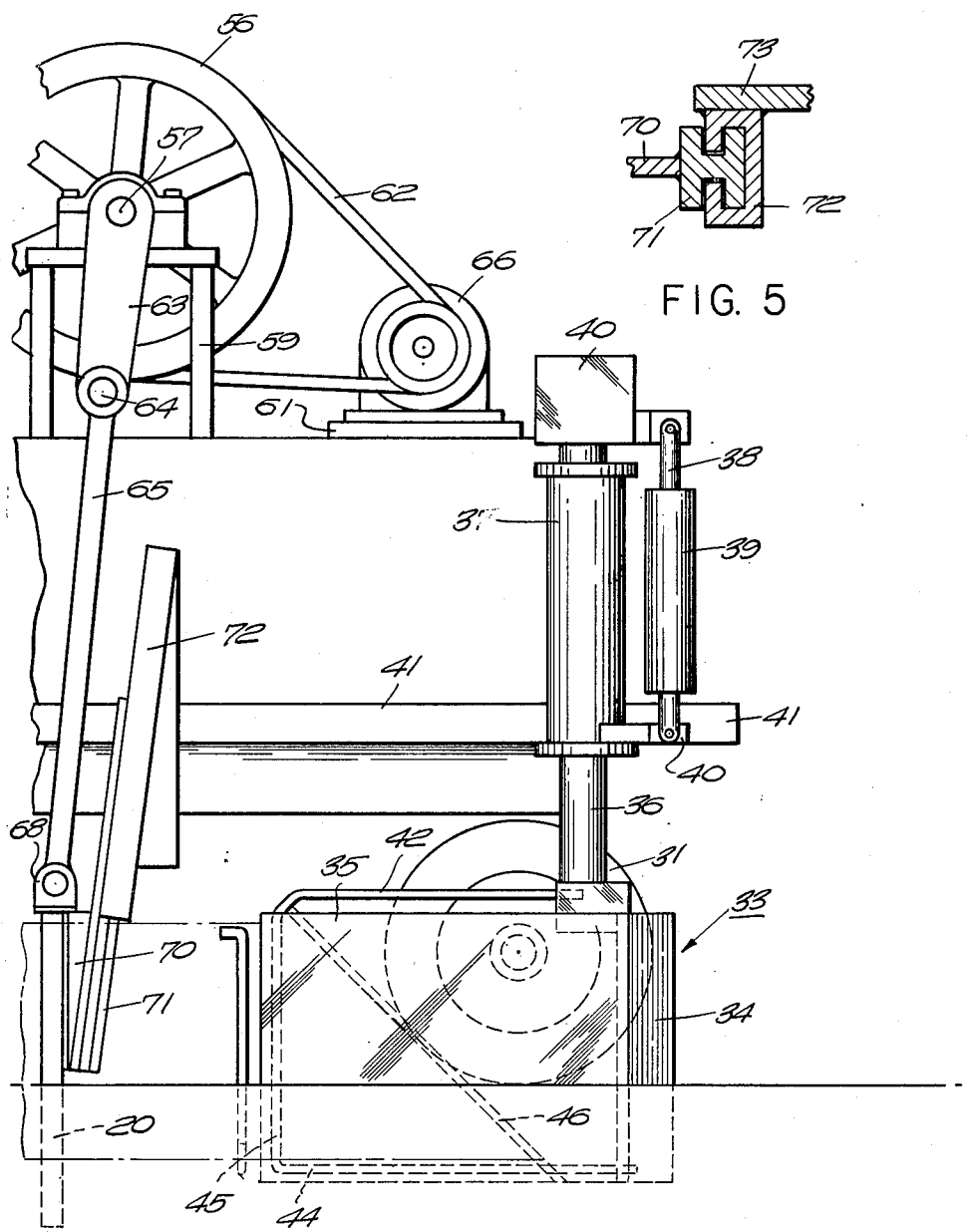
FIGURE 4 is similar to FIGURE 3B and constitutes a continuation of FIGURE 3A, but shows the subsoiler and stake driver in lowered position with a stake in driven position.
FIGURE 5 is a cross-section taken on line 5—5 of FIGURE 3B.
Figure 6:
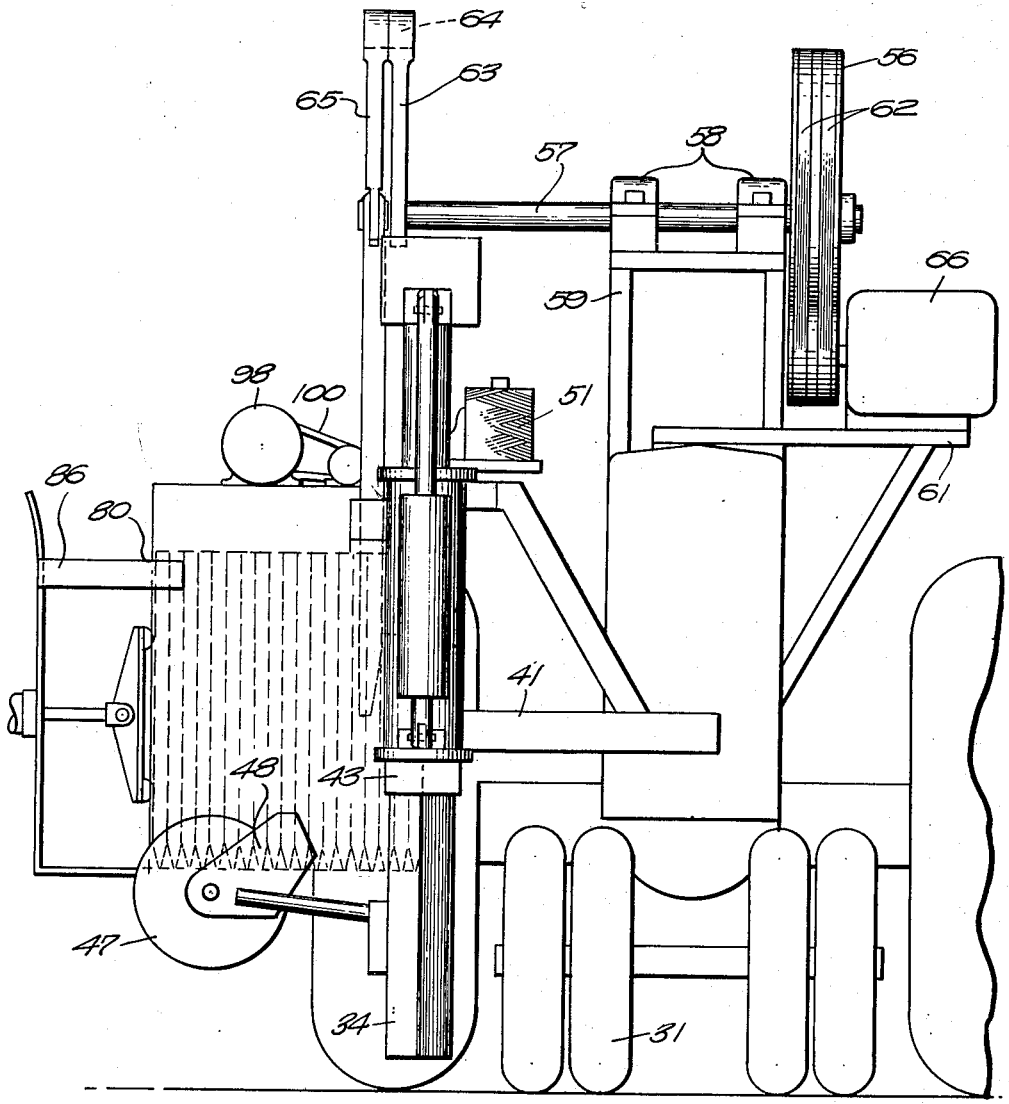
FIGURE 6 is a front elevation view of the apparatus according to the present invention.

A plow or subsoiler 33 is mounted on the tractor at the right front corner thereof. This plow 33 includes a front pointed digging element 34 having two rearwardly extending substantially parallel spaced plates 35 constituting the wings of the plow and integral with digging element 34. The plow is mounted in a cantilever fashion from a vertically extending shaft 36 which is reciprocal in a vertical shaft mounting bearing 37. The shaft 36 extends through and slidably engages the mounting bearing 37. The upper end of a piston rod 38, reciprocal in a hydraulic cylinder 39, is swingably attached to a mounting block 40 integral with the upper end of shaft 36. The lower end of cylinder 39 is swingably affixed to bearing 37 by a pivot plate 40 integral with bearing 37. Various support plates 41 are integral with the frame of the tractor and extend sidewise from the tractor to provide a rigid mounting for bearing 37. A suitable source of pressurized fluid is provided for the cylinder 39 and upon introduction of the fluid in the lower end of the cylinder, the piston rod 38 moves upwardly thereby elevating shaft 36 and the plow or subsoiler 33 from the position shown in FIGURE 4 to the position shown in FIGURE 3B. FIGURE 4 shows the plow 33 in its lowered position in engagement with the soil and operative to cut or dig a narrow channel or slit in the soil to receive the lower end of the plastic film. FIGURE 3B shows the plow 33 in elevated non-operative position.

Figure 11:
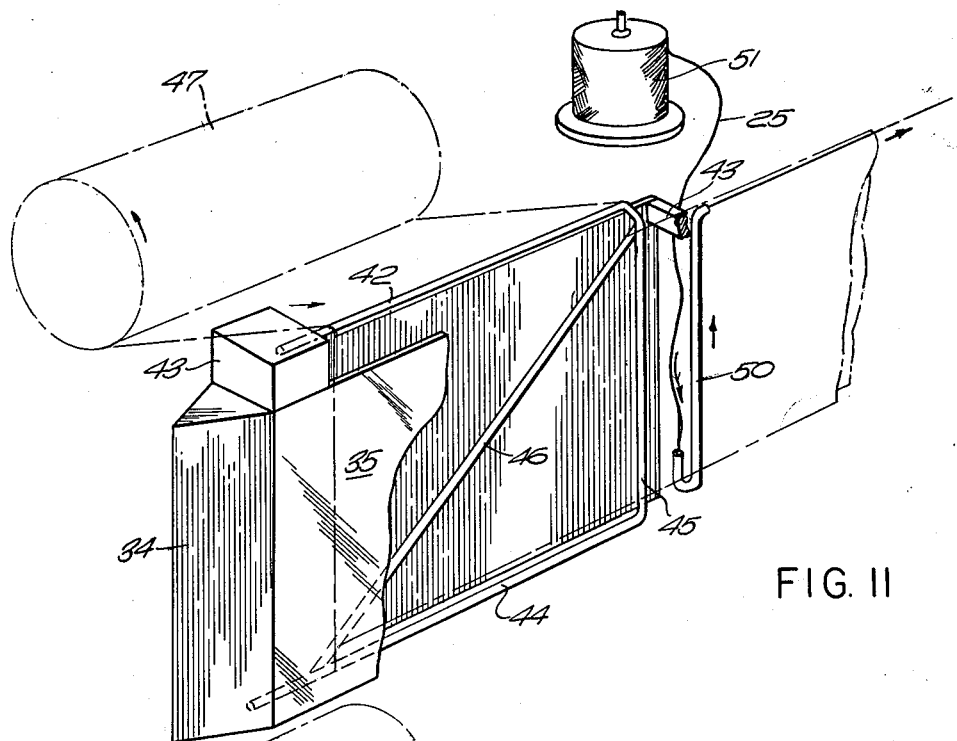
FIGURE 11 is a perspective of the subsoiler and film-feeding mechanism with parts removed for clarity.
Figure 12:
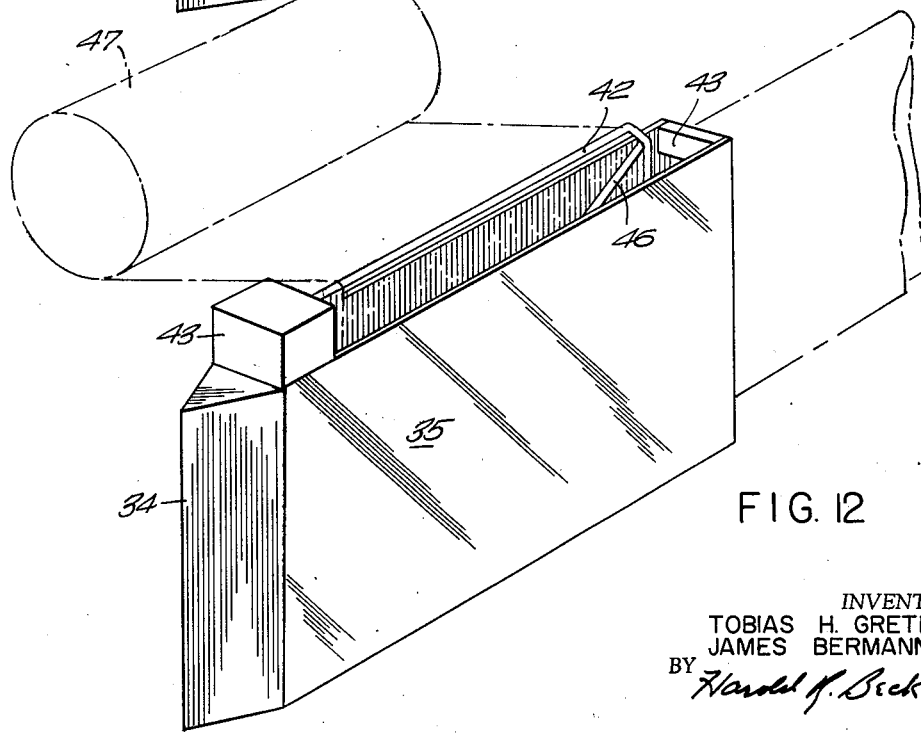
FIGURE 12 is a perspective view similar to FIGURE 11 but showing the entire subsoiler in operative position.

Referring specifically to FIGURES 11 and 12, the digging element 34 and integral plates 35 form a rectangular enclosure open at the top and rear sides. A horizontal rod 42 is mounted on a front plate 43 which is integral with the top side of digger 34. Rod 42 is located immediately above the top opening of the plow 33 and can be mounted in end bearings for rotation about its longitudinal axis if desired. A lower rod 44 is mounted horizontally within and near the bottom of the rectangular enclosure formed by plates 35 and element 34. The forward end of rod 44 is mounted in a hole in the rear side of digging element 34. The rearward end of rod 44 is integral with a vertically extending rod 45 affixed at its upper end to rod 42. Rod 44 can be end mounted in bearings for rotation about its longitudinal axis if desired. A third rod 46 is mounted within the rectangular enclosure and extends in an angular relationship to rods 42 and 44.

Preferably rod 46 is disposed at about 45 degrees from the horizontal in a rearwardly projecting direction. The lower end of rod 46 is integral with rod 44 and the upper end of rod 46 is integral with rods 42 and 45. Rod 44 can be end mounted in bearings for rotation about its longitudinal axis.

A roll of plastic film 47 is mounted for rotation about its longitudinal axis immediately adjacent the plow 33. Suitable plates 48 are provided with integral bearings housing the axle of the roll 47. The plates 48 are affixed to supports 49 which are welded to the plates 35 of plow 33. Thus upon raising or lowering the plow 33, the plastic roll 47 is moved likewise. The plastic sheet from the roll is fed toward the plow 33, over the top rod 42, downwardly between the plates 35, under the bottom rod 44, and then up over the diagonal rod 46 which functions as a direction changer for the sheet, thereby feeding the sheet rearwardly of the plow 33 while implanting the lower edge (or edges) of the film in the trench 22 cut in the soil by the digger element 34. In our preferred embodiment shown in the drawings, the plastic sheet is a continuous fluid impervious film folded longitudinally into two side portions with a crease or fold along one edge. The plastic film is positioned on the roll 47 such that the folded edge is upward after the film passes from the diagonal rod 46 rearwardly from the plow 33. In FIGURE 8, the folded or creased edge of the sheet is on the left hand side of roll 47.

Immediately behind the plow 33 is a feeding device for the longitudinal support member which preferably is a string or cord 25. The feeding device is a U-shaped tube having a first leg 49 outside the plastic film, connected by a U-tube to a second leg 50 positioned inside the folded plastic film. The U-tube connecting the legs passes beneath the lower edge of the film. The tube leg 50 terminates at its upper end in an L-shaped configuration opening rearwardly of the plow 33.

The string or cord 25 is fed from a spool 51, mounted on a vertical axis, for rotation on the tractor, into the open end of tube leg 49, through legs 49 and 50 and the connecting U-tube and out the end opening of tube 50 to position the string or cord within the upper fold of the plastic film. The entrance end for the U-shaped tube into which the string or cord is fed, is positioned outside the plastic film and the exit end of the tube is positioned within the crease or fold of the plastic film as shown in FIGURES 11 and 12.

We have shown in FIGURES 9 and 10 alternative modes of feeding the plastic film. In FIGURE 9 the plastic is fed from the roll 47 around a single diagonal rod 52, positioned within the space between the plow plates 35 and preferably at about 45 degrees to the horizontal, and in a rearwardly direction upon leaving rod 52 to deposit the film in the trench 22. The rod 52 operates as a right angle direction changer for the film. The folded or creased edge of the film is on the right hand side of the roll as viewed in FIGURE 8 to position the creased or folded edge upward upon deposition in trench 22.

In FIGURE 10 we have shown the plastic film being fed downwardly from roll 47, around a diagonal rod 53, positioned between the plow plates 35, then forwardly around a vertically extending and rotatable rod 54 which reverses the direction of the plastic film and feeds it rearwardly of the plow 33. The rod 53 functions as a right angle direction changer for the film and rod 54 functions as a direction reverser for the film.

Although we only have shown several specific modes for feeding the film, various other configurations of feeding mechanisms are apparent and the controlling factor is to feed the film such that it is deposited with its lower edge (or edges in the case of folded film) in trench 22. Our preferred film feeding method is to deposit the lower edge of the film in trench 22 immediately behind the digging element 34 while the plow plates 35 maintain the side walls of the trench if the side walls of the trench have caved or tumbled into the trench. Of course, the film can be deposited in the trench at a point remote from where the trench was dug if the side walls of the trench are prevented from tumbling or caving in. This result may be effected by sloping the side walls upwardly and outwardly to form an inverted cone or truncated cone shaped trench.

A stake driving mechanism 55 (FIGURES 3B, 4, 6 and 8) is located immediately behind the cord feeding device. A bull wheel 56, having an integral axle 57 rotatably mounted in bearings 58 supported by mounting plates 59 affixed to the tractor, supplies the driving force for the stake driver. The bull wheel has substantial mass such that the kinetic energy of the wheel is very large at the starting point for driving the stake.

The bull wheel is driven by a motor 60, preferably hydraulically operated, mounted on a motor support plate 61 affixed to the tractor. The motor 60 drives a continuous belt 62 which in turn drives the bull wheel 56.

The axle 57 rotates an arm 63 integral with the end of the axle on the right side of the tractor. Arm 63 is pivotally joined, by a pin 64, to a driving arm 65. The arm 65 is pivotally joined, by a pin 66, to a stake driving head. The head includes a yoke 68 which receives the pin 66; a flat bottom driving plate 67 affixed to the under side of the yoke and engageable with the upper end of the stake during driving thereof; a stake backing plate 69 affixed to the under side of the driving plate and engageable with the side of the stake (toward the tractor) during driving thereof to stabilize the stake against sidewise movement; an inverted V-shaped spacer bar 70 integral with the under side of the driving plate and engageable with the forward side of the stake during driving thereof; and an H-shaped slide bar 71 affixed to the forward sloping face of the V-shaped spacer bar 70.

A slide race, along which the stake driving head reciprocates, includes a C-shape race 72 affixed to a vertical support plate 73 welded to support plate 41 integral with the tractor frame. The race 72 is inclined forward toward the direction of movement of the tractor and at an included acute angle to the horizontal. One flange of the slide bar 71 fits into and reciprocates along the race 72. The front sloping face of the spacer bar 70 is at the same angle as the race 72.

Since the machine is continuously moving forward during the diking operation (preferably at about 1.5 miles per hour) and the stakes are being continuously driven at about equally spaced locations upon each rotation of the bull wheel 56, it is necessary that the stake driving mechanism be constructed to allow for forward movement of the machine during driving of the individual stakes. Thus the stake driving mechanism must drive the stake vertically into the soil, but this stake driving requires a period of time equal to the time interval for the bull wheel 56 to move from the position shown in FIGURE 3B to the position shown in FIGURE 4. Since the stake cannot be moved forward once it engages the soil, and the machine is continually moving forward, the stake driving head must move rearwardly of the machine to compensate for the forward movement of the machine. This is accomplished by the inclination of the race 72 such that the stake driving head moves rearwardly simultaneously with its downward movement. The angle at which the race 72 is inclined depends upon the speed of forward movement of the machine—as the machine moves faster, the included angle lessens between the race 72 and the horizontal. Of course, as the inclination of race 72 is changed, the front sloping face of spacer bar 70 must be changed to conform with the inclination. The speed of rotation of the bull wheel 56 is regulated to drive a stake at equally spaced locations having the desired distance between the locations.

It is desirable in some applications of the present invention to utilize an activator switch for the motor 60. A counter wheel (not shown) may be placed on the roll of film, or in contact with the film after leaving the roll, such that the counter records the number of feet of film fed from the roll and upon reaching a predetermined value, the counter activates motor 60 to drive a stake 20. Immediately after activation of the motor, the counter resets to zero to commence counting again for the next increment of film. This counter arrangement insures accurate spacing of the stakes since the stake driver is not activated until a predetermined length of film has been fed from the roll and deposited in the soil trench. Various other mechanisms can be used to achieve the same result as the counter described above: a wheel rotatable against the soil as the machine moves forward, and capable of activating motor 60 after a predetermined distance has been covered by the wheel; an electronic or microswitch sensing device activatable by a driven stake whereby the motor 60 is activated. However, our preferred embodiment is shown in the drawings wherein the machine moves continually forward at a predetermined speed and the stake driver is continuously operated to drive the stakes at about equally spaced locations.

A stapling mechanism 75 (FIGURE 8) is located immediately behind the stake driving mechanism 55. The stapling mechanism includes a well-known stapling device 76, an integral cross-arm 77, and a rotatable backing roller 78. The folded film 23 passes beneath the cross-arm 77 and between the stapling device 76 and backing roller 78. The stake 20 passes beneath the cross-arm 77 and between the film 23 and backing roller 78. The stapling device 76 is the type which dispenses a vertically disposed U-shaped staple 26 as shown in FIGURE 2. The backing roller 78 engages the outside surface of the stake near the upper end to stabilize the stake during the stapling operation. Preferably the staple is driven around the string or cord 25 into the upper end of the stake as shown in FIGURE 2. The stapling operation must be very rapid since the film and stakes are moving continuously past the stapler. We have found that it is desirable to resiliently mount the stapling device 76 such that the device can move a short distance rearwardly on the machine with the stake and film. This allow additional time for the stapling operation from the moment of engagement of the staple with the stake to completion of the insertion of the staple in the stake.

In FIGURES 13–15, we have shown a feed mechanism for individually feeding the stakes 20 into a position to be driven beneath the stake driving mechanism 55. The feed mechanism includes a rectangular metal enclosure 79 having parallel side walls 80, side wall extensions 81 integral with and extending downwardly from the side walls 80 to house a chain drive to be described hereinafter, and bottom plates 82 welded to and between the side walls 80 and extensions 81 to maintain them in spaced parallel relationship. An integral top plate 83 maintains the upper ends of side walls in spaced parallel relationship. The upper portions of the side walls 80 extend above the top plate 83 and provide a housing for a chain drive to be described hereinafter.

The side wall extensions 81 have a continuous kerf 84 along their inside upper edges to slidably receive and align the lower end of stakes 20. The upper ends of the stakes pass beneath top plate 83.

A feed magazine (see right side of FIGURE 13) is provided to deposit stakes into the rectangular enclosure. This magazine includes a bottom plate 82, an end plate 85 flared outwardly at its top and affixed to plate 82 to form an L-shaped enclosure open at its sides, and connector bars 86 affixed between side walls 80 and end plate 85. A hydraulic cylinder 87 is mounted on and has a reciprocating piston rod 88 extending through the end wall 85. A shoe 89 is pivotally mounted on the free end of piston rod 88.

The magazine is loaded by inserting a plurality of stakes into the top of the magazine as shown by the arrow in FIGURE 13. The piston rod 88 and shoe 89 are retracted to the right in FIGURE 13 during loading of the magazine. The lower ends of the stakes seat against plate 82 and the upper ends are held between connector bars 86. The cylinder 87 is then activated, by suitable manual controls, to drive the rod 88 and shoe 89 against the stakes thereby pushing the stakes to the left in FIGURE 13 to a position between side walls 80.

The side walls 80 are welded to supports 41 integral with the frame of the tractor thereby maintaining the feed mechanism stationary relative to the tractor.

The chain drives mounted at the top and bottom of the feed mechanism are identical in construction, therefore only one will be described herein. The chain drive includes a pair of spaced sprockets 90 conventionally mounted on an axle fitted at its ends in bearings affixed to side walls 80 or extensions 81. A continuous link chain 91 extends around and engages the teeth of each sprocket such that rotation of one sprocket rotates the other sprocket in unison. The chain extending between the sprockets engages and slides along a T-shaped plate 92. The plate 92 on the lower chain drive is affixed between plates 81 and below the upper run of the link chain 91; and the plate 92 on the upper chain drive is affixed between plates 80 and above the lower run of the link chain 91.

Link chains 91 are of well-known construction as shown in FIGURES 14 and 15, and include equally spaced L-shaped link 93 having one leg of the L extending outwardly normal to the plane of the chain. A generally triangularly shaped dog 94 is pivotally mounted by a pin 95 affixed to the outwardly extending leg of link 93. The dog is free to pivot to and from the positions shown in solid and dashed lines in FIGURE 14. The dog is normally biased to the solid line position by a spring 96 coiled around pin 97 and having a first leg engaging an adjacent pin 97 and a second leg engaging the dog 94.

The dogs 94 are pivoted to permit insertion of stakes between plates 80 by cylinder 87 moving shoe 89 from right to left. Thus, assuming that the feeding mechanism is substantially empty; a plurality of stakes are inserted vertically into the magazine while shoe 89 is withdrawn to the right; cylinder 87 is activated to push the stakes to the left in FIGURE 12 into position between side walls 80; dogs 94 pivot from the solid line position to the dashed line position in FIGURE 14 to permit the ends of the stakes to pass the dogs, and then the dogs are biased toward the solid line position, whereby the pointed outer end of each dog engages the end of a stake and activation of the motor driving the sprockets 90 results in movement of the stakes toward the left in FIGURE 13.

The drive mechanism for the sprockets 90 include a motor 98, preferably hydraulically operated, driving a sheave 99, which in turn drives a continuous belt 100. Belt 100 passes around an idler sheave 101 and a sheave connected to the shaft of sprocket 90. Thus activation of motor 99 drives each sprocket 90 to move link chain 92 and dogs 94 toward the left in FIGURE 13 when the dogs are engaged with the stakes 20. The motor 98 may be intermittently operated by manual manipulation or continuously operated with a slip clutch on the drive shaft.

FIGURE 13 illustrates a stake positioned below the stake driving mechanism 55 preparatory to driving the stake. A holder bar 102 is pivotally mounted at its upper end, by pin 103, to the tractor. The lower end of holder bar 102 engages the bottom end of stake 20 positioned beneath the stake driving mechanism 55. A spring 104 resiliently urges the bar 102 into engagement with the stake. The backing plate 69 engages the holder bar 102 as the stake is driven and pivots bar 102 to the left in FIGURE 13 out of the downward path of movement of the driving head.

*Operation*

The tractor 30 is activated to move forward along a desired path; hydraulic fluid is exhausted from the lower end of cylinder 39 thereby lowering subsoiler 33 into the soil 21 (from the position shown in FIGURE 3B to the position shown in FIGURE 4); the plastic film has previously been threaded on the rods 42, 44, 46 and out the rear of the tractor; string 25 has previously been threaded through the string feeder tubes into the crease in the film; a stake is driven into the soil by activating the motor 66 and stapler 75 is activated to staple the film and string to the driven stake. The operation of the machine continues in a forward direction by feeding film from roll 47, around the rods, etc. until a continuous supported water barrier is established along the desired path. The stake driver is either continuously or intermittently operated.

While we have described a present preferred embodiment of our invention, it may be otherwise embodied within the scope of the following claims.

We claim:

1. Apparatus for positioning a plastic film fluid barrier in a narrow slit in the earth and extending upright therefrom, comprising: a vehicle having a frame and movable along the earth, digging means mounted on the vehicle to penetrate the earth to dig said narrow slit therein, said digging means including a front plow positionable below the frame to dig the slit and upright elongated plates affixed to and behind the plow, said plates being spaced from each other to provide an elongated open space immediately behind the plow, said plates extending lengthwise of and, during operation, being partly disposed within said earth slit; roll supporting means on said vehicle adapted to support a roll of plastic film and to dispense and feed a continuous elongated strip of plastic film from the roll; strip upright directing means supported within said elongated open space and operable for receiving the strip from said supporting means and depositing the strip upright with the lower edge of the strip in said slit; stake driving means mounted on the vehicle behind said digging means, said stake driving means including a reciprocating driving head, mounted to move vertically at an included obtuse angle to the earth toward the rear of said stake driving means, said angle being determined by the rate of movement of the vehicle along the earth and the spacing between the stakes, power means mounted on the vehicle to reciprocate said driving head up and down relative to the earth; operable for positioning the stakes to be driven immediately below said head and laterally off-set from the central alignment with the elongated space between the plates, and fastening means operable to connect the strip to each stake to maintain the strip in upright position.

2. An apparatus according to claim 1, including: a first bar affixed to the vehicle and maintained in a stationary position in the open space behind the plow, said first bar extending lengthwise of said plates, a second bar affixed to the vehicle and maintained in a stationary position within the open space behind the plow, said second bar being positioned and included at an acute angle to the first bar; such that said film passes from said roll, through said first and second bars and out the reaward space between said elongated plates to be inserted vertically in said slit.

3. An apparatus according to claim 1 including fastening means mounted on said vehicle and operable to fasten said film to the individual stakes in timed relationship to said stake driving means and after the stakes are driven into the earth.

4. An apparatus according to claim 1 including strip folding means operable to fold the strip along its upper edge to provide a double thickness; and cord feeding means on said vehicle operable to feed a continuous length of cord into the strip fold.

5. An apparatus for providing a water barrier along a predetermined path; comprising: a vehicle movable along the earth in said path; plow means affixed to the vehicle operable to cut a narrow slit in the earth conforming to said path, feed means on the vehicle operable to supply vertically disposed continuous plastic film to said slit behind said plow; stake driving means on the vehicle operable to imbed the lower ends of vertically disposed stakes in the earth along said path, and fastening means mounted on the vehicle to affix said film to the upper end of each stake such that the film is maintained in a vertically disposed position along said path.

6. An apparatus according to claim 5 including, secondary feed means on the vehicle to supply a continuous length of cord to the upper edge of said film, and said fastening means being operable to affix both said film and cord to the stakes.

7. An apparatus according to claim 5 wherein said fastening means is a stapler which staples the film to the upper end of each stake.

8. An apparatus according to claim 5 wherein said stake driving means includes a reciprocating driving head mounted to move vertically at an included obtuse angle to the earth toward the rear of said power means, said angle being determined by the rate of movement of the vehicle along the earth and the spacing of said stakes, activating means mounted on the vehicle operable to reciprocate the driving head up and down relative to the earth, and holding means operable to position a stake to be driven immediately below said head.

References Cited by the Examiner

UNITED STATES PATENTS

| 2,314,045 | 3/43 | Johnson | 61—72.6 |
| 2,393,395 | 1/46 | Millard | 61—72.6 |

FOREIGN PATENTS

| 882,070 | 11/61 | Great Britain. |
| 1,188,363 | 3/59 | France. |
| 93,022 | 12/59 | Netherlands. |

OTHER REFERENCES

Engineering News-Record, page 69, May 15, 1958.

EARL J. WITMER, *Primary Examiner.*

JACOB L. NACKENOFF, *Examiner.*